Dec. 31, 1963      J. E. KOVACH      3,115,974
AUTOMATIC OFF-BEARING EQUIPMENT FOR BLOCK MOLDING MACHINE
Filed July 21, 1960      3 Sheets-Sheet 1
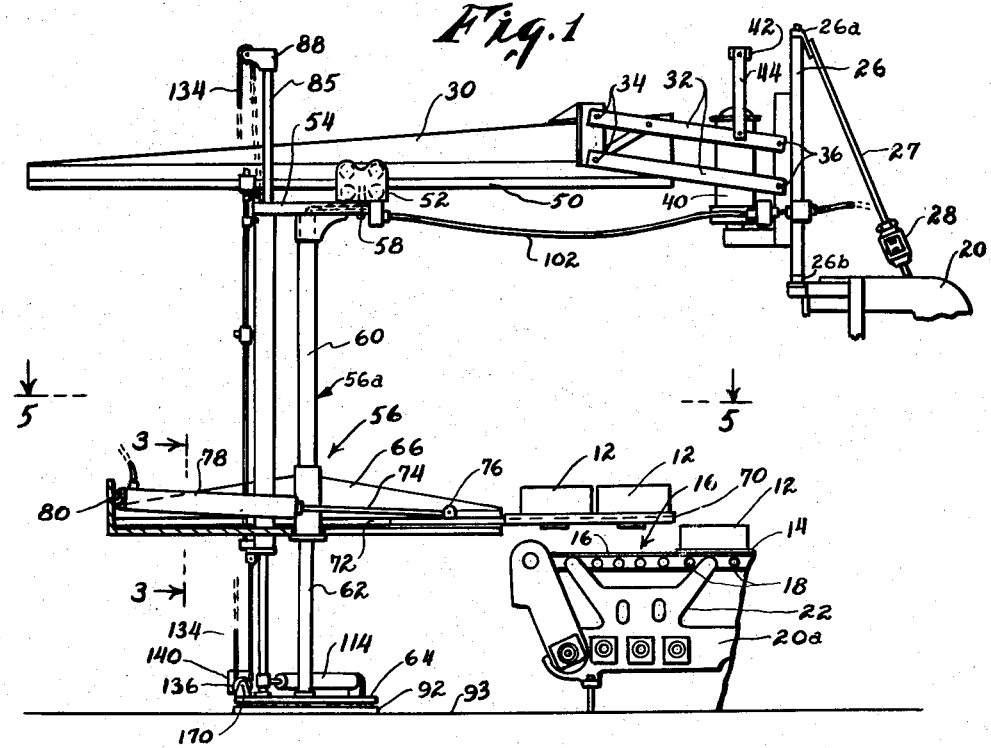
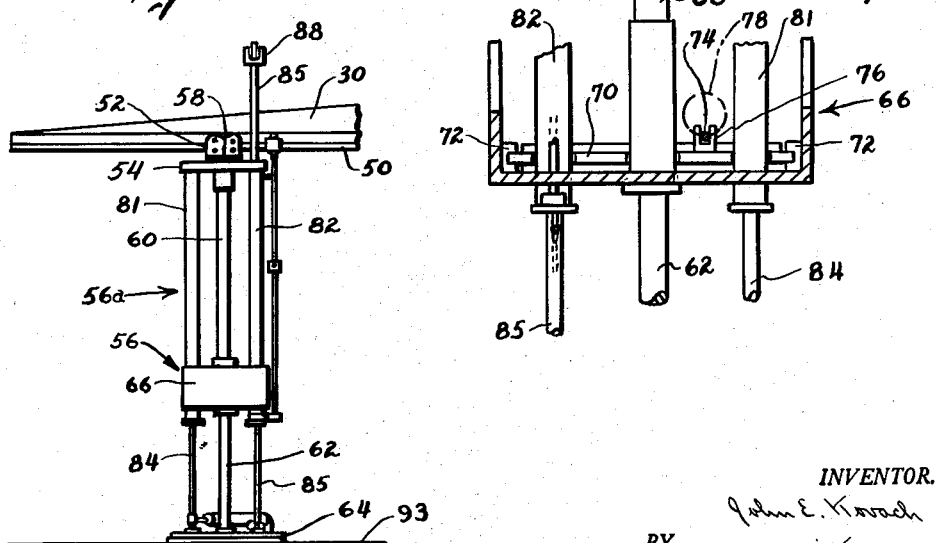
INVENTOR.
John E. Kovach
BY Emery, Whittemore,
Sandoe & Graham
ATTORNEYS

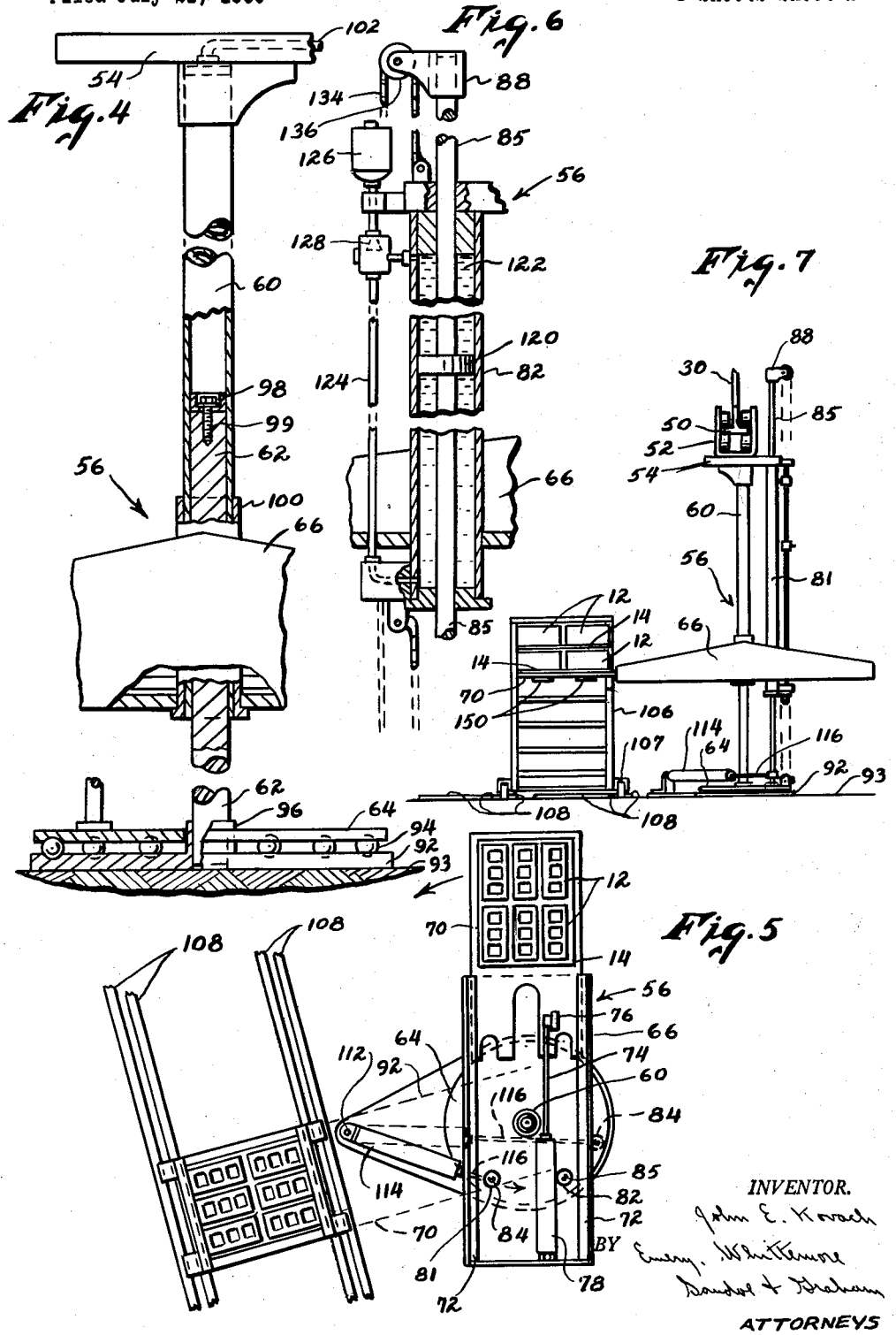

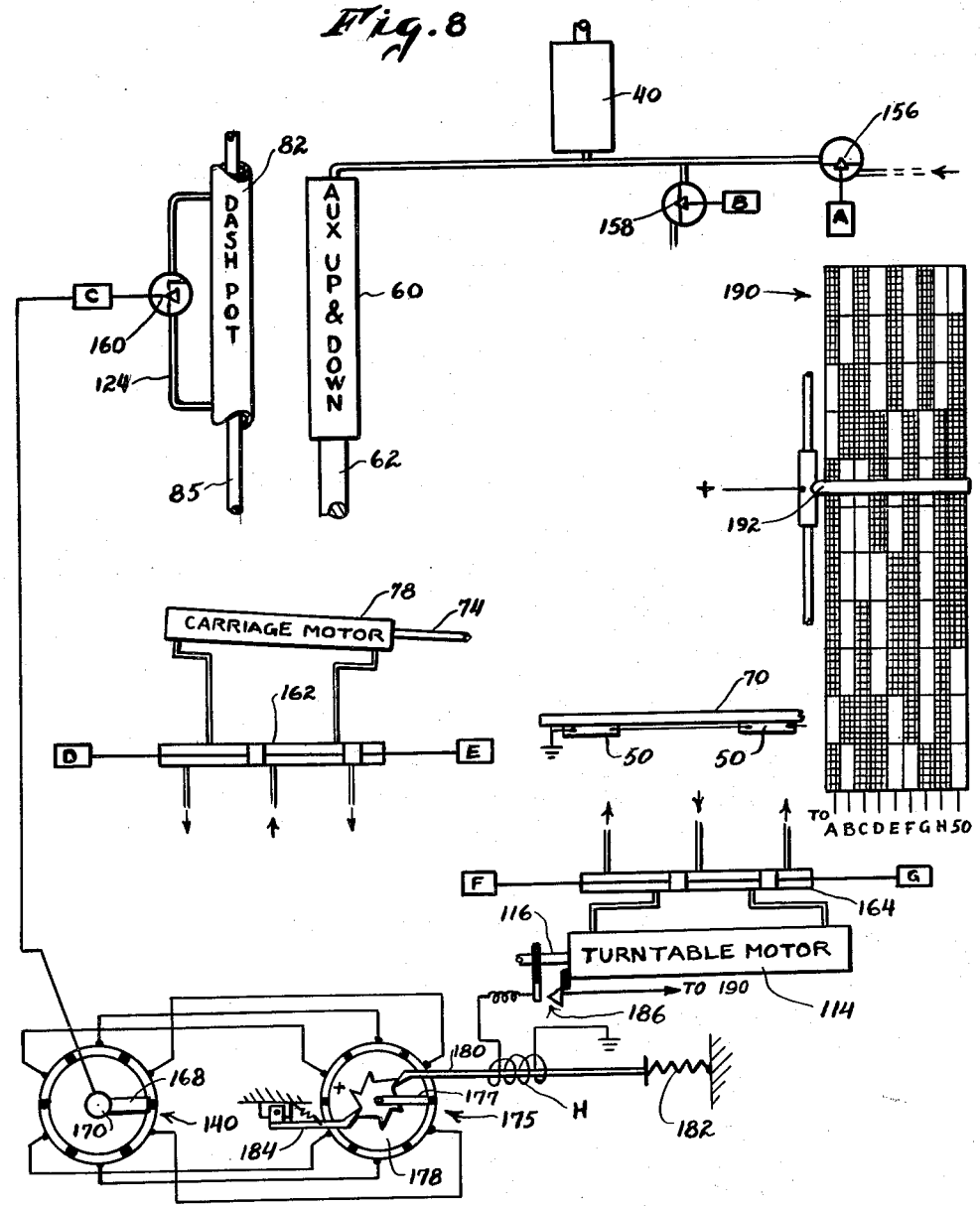

United States Patent Office 3,115,974
Patented Dec. 31, 1963

3,115,974
AUTOMATIC OFF-BEARING EQUIPMENT FOR BLOCK MOLDING MACHINE
John E. Kovach, Nutley, N.J., assignor to Bergen Machine & Tool Company, Inc., Nutley, N.J., a corporation of New Jersey
Filed July 21, 1960, Ser. No. 44,393
6 Claims. (Cl. 214—16.4)

This invention relates to the removal of loaded pallets from block molding machines, and more especially to the removal of the pallets and the depositing of them in racks automatically without the intervention of an operator.

Machines for molding building blocks, such as concrete and cinder blocks, deposit the blocks on pallets and move the loaded pallets to a delivery station. The loaded pallets are taken from the delivery station by off-bearing equipment that includes a fork which moves in under the pallet and which is then raised to lift the loaded pallet from the delivery station.

Off-bearing equipment is power operated and has mechanism for raising and lowering the fork. It may or may not have power means for transporting the fork to the rack where the loaded pallet is to be deposited; but in any event most off-bearing equipment requires the constant attention of an attendant when a block machine is in operation.

In plants where the off-bearing and racking of pallets has been made automatic, the equipment has been very expensive, and there has been no way in which conventional off-bearing equipment could be made automatic.

It is an object of this invention to provide improved and simplified automatic off-bearing equipment; and it is another object of the invention to provide means for making conventional off-bearing equipment automatic.

The invention is intended primarily for use with a popular type of off-bearing equipment in which the forks extend from a carriage that hangs from a boom supported from the frame of the block machine and extending beyond the delivery station and far enough to permit the carriage to move the fork into position to deposit a loaded pallet in a rack.

Another object of the invention is to provide a block molding machine with off-bearing equipment having operating mechanism and power means that can be operated automatically with efficient, rugged, and inexpensive control means.

One feature of the invention which simplifies the automatic off-bearing equipment is the provision of only one rack position to which loaded pallets must be conveyed by the fork; and means are provided for replacing filled racks with empty ones delivered to the rack loading position without any delay in the operation of the off-bearing equipment.

Other objects, features, and advantages of the invention will appear or be pointed out as the description proceeds.

In the drawing, forming a part hereof, in which like reference characters indicate corresponding parts in all the views:

FIGURE 1 is a diagrammatic elevation showing the off-bearing equipment of this invention associated with a block molding machine, portions of the block molding machine being shown in this view in elevation;

FIGURE 2 is a fragmentary view, on a reduced scale, of a portion of the apparatus shown in FIGURE 1 after the carriage has swung through an angle of 90°;

FIGURE 3 is a fragmentary, sectional view, on an enlarged scale, taken on the line 3—3 of FIGURE 1;

FIGURE 4 is a fragmentary view, on an enlarged scale, showing the apparatus for raising and lowering the carriage of FIGURE 1;

FIGURE 5 is a fragmentary top plan view of a portion of the apparatus shown in FIGURE 1, this being a plan view of that portion of the apparatus taken from the plane 5—5 of FIGURE 1;

FIGURE 6 is a diagrammatic sectional view of the mechanism shown in FIGURE 1 for locking the carriage at different selected levels for depositing blocks on different shelves of a pallet rack;

FIGURE 7 is a diagrammatic view illustrating the way in which blocks are deposited on a rack when the carriage swings into a transversely extending position; and FIGURE 8 is a diagram showing the wiring and the working fluid circuits of the mechanism shown in the other views.

The off-bearing equipment of this invention is intended for use with conventional plain pallet machines in which molded concrete or cinder blocks 12 are delivered on pallets 14 to a conveyor 16, commonly referred to as the delivery table of the machine. Ordinarily the delivery table includes two endless belts or chains 16 which have their proper runs supported by rollers 18; and these chains 16 support opposite ends of the pallets 14, leaving the center portions of the pallet unobstructed underneath so as to permit forks or other supporting means to be projected under the pallets for lifting them from the delivery table 16.

The sides of the pallet 14, and the number of blocks which are deposited on the pallet, depend upon the size of the machine. A popular size of block molding machine delivers six blocks 12 in two rows on the pallet 14 and the off-bearing equipment of this invention is shown as applied to such a machine. The portion of a block molding machine 20 which supports the delivery table is indicated by the reference character 20ª in FIGURE 1. Empty pallets are returned to a magazine 22 supported by the portion 20ª underneath the delivery table 16.

There is a mast 26 supported by bearing means 26ª and 26ᵇ from the upper part of the frame 20 of the block molding machine. This mast is braced by a guy 27 having a turnbuckle 28 for insuring vertical positioning of the mast 26. A boom 30 extends horizontally from the block molding machine and the boom swings about the axis of the mast 26. This boom is connected to the mast 26 by links 32 which extend parallel to one another, and which are connected to the boom by a bracket and by pivots 34. At their other ends, the links 32 are connected to the mast 26 by pivots 36.

The distance between the pivots 34 is the same as the distance between the pivots 36 and thus the links 32 and the brackets to which they are connected by the pivots 34 and 36 form a vertically swinging parallelogram by which the boom 30 is supported. A fluid actuated motor 40 is connected with one of the links 32 by a yoke 42 on the piston rod of the motor and by a link 44 which connects the yoke 42 with the upper link 32. It will be understood that there are two similar folding parallelograms on both sides of the motor 40 for supporting the boom 30 and that there is another link 44 on the other side of the yoke 42 of the motor 40.

Operation of the motor 40 to fold the parallelogram causes the boom 30 to be raised or lowered while always leaving the boom 30 in a horizontal position. This mechanism for supporting the boom 30 and for raising and lowering it with respect to the frame 20 of the block molding machine is of conventional construction.

Flanges 50 extend outwardly from opposite sides of the boom 30 at its lower end; and there is a carriage or trolley 52 with wheels which run along the flanges 50 as a track. An upper element 54 of a carriage assembly 56 is supported from the trolley 52 by a pivot connection 58. This pivot connection 58 permits the element 54 to swing about a vertical axis of the pivot 58, but during this swinging movement, the trolley 52 moves along the track 50, as will be further explained, and it should be understood that the pivot 58 is not a fixed pivot about which the apparatus operates.

The carriage assembly 56 also includes frame 56ᵃ comprising an upper portion which consists of a long cylinder 60 extending downwardly from the upper element 54, and a lower portion which consists of a piston rod 62 extending up into the cylinder 60, and extending downwardly to a connection with a turntable 64. A carriage support 66 is connected to a lower part of the cylinder 60. The carriage assembly includes extendible and retractable elements, one of which is a carriage 70 which slides along guides 72 (FIGURE 3) on the carriage support 66.

A piston rod 74 is attached to a yoke 76 secured to the carriage 70. This piston rod 74 is part of a fluid motor 78 pivotally connected by a pin 80 (FIGURE 1) to one end of the carriage support 66.

Reciprocation of the piston rod 74 of the motor 78 causes the carriage 70 to slide back and forth along the guides 72. When in its backward or retracted position, the carriage 70 is located above the carriage support 66; but when the carriage 70 is in its forward or extended position, a large portion of it is beyond the carriage support 66 and in position to extend under a pallet 14 located on the delivery table 16.

The carriage assembly 56 also includes two other cylinders 81 and 82 connected at their opposite ends with the upper frame 54 and the carriage support 66. There is a piston rod 84 extending from the cylinder 81 to the turntable 64 and there is a piston rod 85 extending from the cylinder 82 downwardly to the turntable 64 and also upwardly, through the other end of the cylinder 82, to a bracket 88 located at a substantial distance above the boom 30; the bracket 88 being carried by the upper end of the piston rod 85. The piston rods 62, 84 and 85 remain stationary with respect to the turntable 64 and the cylinders 60, 81 and 82 move with respect to the piston rods.

The turntable 64 rotates about a vertical axis and is supported by a fixed base 92 located on a floor 93 of the plant where the block making machine is operated. In the construction illustrated, the turntable 64 is supported from the base 92 by ball-bearings 94 (FIGURE 4) which run in grooves in the turntable 64 and the base 92. The piston rod 62, which extends downwardly to the turntable 64, extends through the turntable and into a bearing 96 secured to the base 92. With this construction, the piston rod 62 can rotate in the bearing 96, but the apparatus can be constructed so that the piston rod 62 is fixed and the cylinder 60 rotates with respect to the piston rod. The bearing 96 serves also as the center bearing for preventing transverse displacement of the turntable 64 in the event that side thrust becomes sufficient to lift the turntable with respect to the ball-bearings 94.

FIGURE 4 also shows a packing cup 98 at the upper end of the piston rod 62 and connected to the piston rod 62 by fastening means, here shown as a screw 99. The carriage 66 has a sleeve 100 secured to it; this sleeve fits over and is connected to the cylinder 60 so that the carriage support 66, the cylinder 60, and the upper frame 54 are rigidly connected together so that they move up and down, and also rotate, as a structural unit. In the preferred embodiment of the invention, the working fluid supplied to the cylinder 60 is air, and this air flows to and from the cylinder 60 through a hose or other conduit 102. While the cylinder 60 and the piston 98 and the piston rod 62 form a fluid motor for lifting the carriage assembly, this motor is only an auxiliary for the fluid motor 40 (FIGURE 1) which is relied on principally for raising and lowering the boom 30 so as to raise and lower the carriage assembly 56, and more especially the carriage support 66 and the carriage 70.

FIGURES 5 and 7 show the apparatus for swinging the carriage assembly 56 about the longitudinal axis of the cylinder 60 in order to shift a loaded pallet from the delivery table of the block molding machine to a pallet rack 106 on a carriage 107 which runs along a track 108 located on the floor 93. The base 92 extends outwardly beyond the turntable 64 on one side, and there is a bracket including a pivotal connection 112 which conducts a cylinder-and-piston motor 114 to the base 92. This motor 114 has a piston rod 116 connected to the piston rod 84 which is in turn connected to the turntable 64. Operation of the motor 114 to extend the piston rod 116 into the dotted line position shown in FIGURE 5 rotates the turntable 64 through an angle of approximately 110° and moves the carriage 70 from the solid line position shown to the dotted line position where the carriage is extended transversely of the tracks 108. The motor 114 is double acting and is used along to swing the turntable 64 and the carriage assembly 56 back into position to take another loaded pallet after each cycle of operation.

Although the carriage 70 always operates within the same range when lifting loaded pallets from the delivery table of the block molding machine, the carriage has to be located at different levels when delivering blocks to the rack 106 (FIGURE 7) and the apparatus for holding the carriage support at the proper level for the different discharge operations to the rack 106 is best illustrated in FIGURES 1 and 6.

There is a piston 120 secured to the piston rod 85. As the cylinder 82 moves up and down as a unit with the rest of the carriage assembly 56, liquid 122 on one side of the piston 120 is displaced through a by-pass pipe 124 to the other side of the piston. For example, if the cylinder 82 is moving downwardly, the liquid 122 above the piston 120 is displaced through the by-pass pipe 124 to the space in the cylinder 82 below the piston 120.

The liquid 122 is preferably a light oil such as used in dash pots, and in order to insure a full cylinder at all times, there is an oil reservoir 126 located at the upper end of the by-pass pipe 124 and there is a check valve 128 which admits oil to the cylinder when necessary, but prevents oil from returning to the reservoir 126.

In order to obtain automatic operation of the machine, it is necessary to have means for determining the level of the carriage support 66 at any particular time. This means includes an endless belt of chain 134 which runs over a wheel 136 carried by the top bracket 82, and which runs over a corresponding wheel 136 (FIGURE 1) carried by a bracket on the turntable 64. The opposite ends of the chain 134 are attached to the upper and lower ends of the cylinder 82, as shown in FIGURE 6. The wheel 136 (FIGURE 1) is connected to an axle which operates a rotary cam switch 140 on the turntable 64.

FIGURE 7 shows the carriage assembly 56 rotated into position with the carriage support 66 facing the rack 106 and the carriage 70 extended into the rack and depositing a loaded pallet 14 on the next-to-top shelf of the rack 106. As soon as the loaded pallet 14 is inserted fully into the rack 106, the carriage support 66 moves downwardly and the carriage 70 leaves the loaded pallet 14 on the shelf. There are magnets 150 secured to the bottom of the carriage 16. Each of the shelves of the rack 106 originally contains an empty pallet, and after moving downwardly from the last-delivered loaded pallet, the carriage 70 brings the magnets 150 into position to pick up the empty pallet on the next shelf below.

The carriage 70 then retracts carrying the empty pallet into the space of the carriage support between the guides 72 (FIGURE 3). The carriage support 66 swings back into line with the delivery table under influence of the turntable motor 114; and the carriage support moves down to its lowest level at which it is in position to extend forwardly under the delivery table 16 and into position to locate the empty pallet in the pallet magazine 22. The magnets 150 are then de-energized, causing them to drop the empty pallet on top of those already in the pallet magazine 22; the carriage 70 again rises between the chains 16 of the delivery table and lifts the next loaded pallet from the delivery table to start a new cycle of operation.

The control apparatus for operating the invention automatically is shown diagrammatically in FIGURE 8. Working fluid, preferably air, is supplied to the boom motor 40 and the cylinder 60, which serves as an auxiliary to the boom motor 40, through a valve operated by a solenoid A. When the solenoid A is energized, its valve 156 is opened and air flows through the conduit 102 to the motor 40 and the cylinder 60. These motors are single acting since the weight of the parts is sufficient to cause the carriage assembly and the boom to move downwardly when air is permitted to exhaust from the motor 40 and the cylinder 60. In order to effect exhaust of air from the motor 40 and the cylinder 60, the solenoid A is de-energized so that the valve 156 closes and another valve 158 is opened by energizing a solenoid B.

Flow of liquid through the by-pass 124 of the dash pot cylinder 82 is controlled by a valve 160 which has a bias toward open position and which is closed by energizing a solenoid C.

The carriage motor 78 is a double-acting motor and the supply and exhaust of working fluid to this motor 78 are controlled by a slide valve 162. The slide valve is moved in one direction by a solenoid D and in the other direction by a solenoid E.

The turntable motor 114 is also double-acting and is operated by a slide valve 164 similar to the slide valve 162 and operated in opposite directions by solenoids F and G, respectively.

Switch 140 is illustrated diagrammatically as a commutator having six segments corresponding to the six shelves of the rack on the car which is loaded by the extendible and retractable carriage of this invention. A brush 168 travels around the commutator and makes contact successively with the different sections of the commutator. This brush is rotated by an axle 170 which is turned by the wheel 136 (FIGURE 1) operated by the chain 134 and therefore responsive to the position of the carriage support as it moves up and down. There is a ratchet switch 175 having a commutator segment similar to the switch 140 and having a brush 177 which moves around the commutator in response to the intermittent operation of a ratchet 178. This ratchet 178 is operated by a pawl 180 in response to intermittent energizing of a solenoid H. This solenoid pulls the pawl 180 back, and a spring 182 thrusts the ratchet 180 forward when the solenoid H is de-energized. There is a holding ratchet 184 for preventing retrograde movement of the ratchet 178. The solenoid H is in series with a switch 186 connected with the piston rod 116 of the turntable motor 114. Each time that the turntable motor reaches one end of its stroke, the switch 186 is closed and the solenoid H is energized. Each time that the turntable motor 114 operates, the switch 186 is opened and the pawl 180 operates the ratchet switch 175 to move the brush 177 to the next segment of the commutator.

A timer for supplying current to the magnets 50 and to the solenoids A–H is illustrated diagrammatically in FIGURE 8. This timer, designated by the reference character 190, includes a separate conductor strip for each of the solenoids and for the magnets 50. Portions of the lengths of these conductor strips are covered with insulating material, indicated in black in the drawing, and a brush 192 travels along the conductor strips and supplies power to all of the strips which are conductive at the particular location at which the brush 192 is located at any particular time. During a cycle of the apparatus, the brush 192 moves from one end of the timer 190 to the other. In the actual construction of the apparatus, the timer 190 is cylindrical so that when the brush reaches one end of the conductor strips it is in position to repeat its cycle starting at the other end. Although this timer is shown diagrammatically it will be understood that it is merely representative of means for supplying power to separate circuits in timed relation and the same results are often achieved by the use of cams operating separate brushes for the circuits to be energized.

The timer 190 supplies power to the solenoid C through brush 177 and switch 140 so as to control cycles for the different shelf levels of the rack 106.

*Sequence of Operation*

| Successive Operations of Carriage 70 | Circuits Energized | | | | | | | |
|---|---|---|---|---|---|---|---|---|
| I. Moves in under loaded pallet | | B | | D | | F | | H | 50 |
| II. Drops empty pallet in magazine | | B | | D | | F | | H | |
| III. Raises and lifts loaded pallet | A | | | D | | F | | H | |
| IV. Retracts and starts swinging | A | | | | E | | G | | |
| V. Continues swing and moves down to proper shelf level | | B | C | | E | | G | | |
| VI. Stops in line with rack | | B | C | | E | | G | | |
| VII. Advances pallet into rack | | B | C | D | | | G | | |
| VIII. Lowers deposits loaded pallet in rack | | B | | D | | | G | | |
| IX. Lowers further and magnet grips empty pallet | | B | | D | | | G | | 50 |
| X. Raises empty pallet while retracting | A | | | | E | | G | | 50 |
| XI. Swings and lowers | | B | | | E | F | | | 50 |

The preferred embodiment of the invention has been illustrated and described, but changes and modifications can be made and some features can be used in different combinations without departing from the invention as defined in the claims.

What is claimed is:

1. The combination with a block-molding machine having a block delivery station at one end to which pallets with blocks thereon are delivered by the machine, of off-bearing mechanism including a frame at a predetermined stationary station spaced from the delivery station, a carriage assembly connected with the frame and supported for angular movement about a substantially fixed vertical axis, the carriage assembly including elements that are extendible and are retractable with respect to the frame, mechanism for raising and lowering the carriage assembly, the extendible and retractable elements of the carriage assembly being long enough, when extended, to reach under loaded pallets at the delivery station for lifting the pallets, a rack at a second predetermined location with respect to the delivery station, mechanism for swinging the carriage assembly about said axis into line with the rack, said rack being close enough to said stationary station to receive loaded pallets from the carriage assembly when the elements of the carriage assembly are extended, and automatic control means connected with said mechanism and operable to control the sequence movement of the carriage assembly in picking up pallets from the delivery station, swinging about said substantially fixed vertical axis into line with the rack, and depositing the pallets in the rack, and in which there is an overhead support for the frame, and the frame includes a lower portion with respect to which the overhead support is movable in a vertical direction toward and from said lower portion of the frame, the mechanism for raising and lowering the carriage assembly including power means that move an upper portion of the frame up and down with said overhead support, the carriage assembly being carried by the upper portion of the frame and being movable up and down as a unit with said upper portion.

2. The combination described in claim 1 and in which the overhead support is a boom supported at one end by the block machine and extending beyond the stationary station, and in which there is a vertically swinging parallelogram linkage by which the boom is connected with the block machine, and the combination includes motor means for swinging the linkage to raise and lower the boom, said boom being connected to a portion of the parallelogram linkage that remains substantially horizontal during raising and lowering of the boom.

3. The combination described in claim 2 and in which at least a portion of the raising and lowering movement of the carriage assembly is produced by the raising and lowering of the boom.

4. The combination with a block molding machine having a block delivery station at one end to which pallets with blocks thereon are delivered by the machine, of off-bearing mechanism including a frame at a predetermined stationary station spaced from the delivery station, a carriage assembly connected with the frame and supported for angular movement about a substantially fixed vertical axis, the carriage assembly including elements that are extendible and are retractable with respect to the frame, mechanism for raising and lowering the carriage assembly, the extendible and retractable elements of the carriage assembly being long enough, when extended, to reach under loaded pallets at the delivery station for lifting the pallets, a rack at a second predetermined location with respect to the delivery station, mechanism for swinging the carriage assembly about said axis into line with the rack, said rack being close enough to said stationary station to receive loaded pallets from the carriage assembly when the elements of the carriage assembly are extended, and automatic control means connected with said mechanism and operable to control the sequence movement of the carriage assembly in picking up pallets from the delivery station, swinging about said substantially fixed vertical axis into line with the rack, and depositing the pallets in the rack, and in which there is a boom extending from the block machine beyond the stationary station, and the combination includes a carriage movable along the boom, a pivotal connection connecting the upper end of the frame with the carriage on the boom with a vertical axis of rotation that is generally parallel to but horizontally spaced from the axis of rotation of the carriage assembly, bearing means on which the boom swings about a vertical axis, and a track on the boom along which the carriage moves when the carriage assembly swings about its vertical axis when transferring pallets from the delivery station to the rack, and during return movement of the carriage assembly to the delivery table for another load.

5. The combination with a block-molding machine having a block delivery station at one end and a boom extending from the block-molding machine beyond the delivery station, of off-bearing mechanism including a carriage assembly and a frame for lifting loaded pallets from the delivery station, bearings on which at least a portion of the frame swings about a substantially fixed vertical axis to shift the carriage assembly from a position in alignment with the delivery station to a position in alignment with a rack, a second carriage movable along the boom, a pivotal connection connecting the upper end of the frame with the second carriage for swinging movement about a vertical axis, a rack with supports for receiving loaded pallets, mechanism for moving the carriage assembly under the delivery table and into pallet-depositing position within the rack, other mechanism that raises and lowers the carriage assembly, still other mechanisms for swinging the carriage assembly about said vertical axis and from a position in alignment with the delivery station to a position in line with the rack, and automatic control means regulating all of the mechanisms in accordance with a definite sequence of operation whereby loaded pallets are taken from the delivery station and deposited in the rack without intervention of an operator.

6. The combination described in claim 5 and in which there is a track extending at an angle to the boom, a rack carriage that moves along the track into and out of position to be loaded by said carriage assembly, said rack being supported on said rack carriage and having space thereon for supporting at least two pallets.

References Cited in the file of this patent

UNITED STATES PATENTS

| | | |
|---|---|---|
| 2,535,961 | Schutt | Dec. 26, 1950 |
| 2,741,371 | Oswalt | Apr. 10, 1956 |
| 2,869,739 | Davis | Jan. 29, 1959 |
| 2,896,800 | Thomas | July 28, 1959 |
| 2,956,696 | Drakengren | Oct. 18, 1960 |
| 3,007,097 | Shelley et al. | Oct. 31, 1961 |